(12) United States Patent
Styborski et al.

(10) Patent No.: US 10,815,793 B2
(45) Date of Patent: Oct. 27, 2020

(54) TRIP STRIPS FOR AUGMENTED BOUNDARY LAYER MIXING

(71) Applicant: United Technologies Corporation, Farmington, CT (US)

(72) Inventors: Jeremy Styborski, East Hartford, CT (US); William P. Stillman, Sturbridge, MA (US)

(73) Assignee: Raytheon Technologies Corporation, Farmington, CT (US)

( * ) Notice: Subject to any disclaimer, the term of this patent is extended or adjusted under 35 U.S.C. 154(b) by 105 days.

(21) Appl. No.: 16/012,300

(22) Filed: Jun. 19, 2018

(65) Prior Publication Data

US 2019/0383150 A1    Dec. 19, 2019

(51) Int. Cl.
| F01D 5/18  | (2006.01) |
| F01D 5/14  | (2006.01) |
| F01D 25/12 | (2006.01) |

(52) U.S. Cl.
CPC ............ *F01D 5/188* (2013.01); *F01D 5/141* (2013.01); *F01D 25/12* (2013.01); *F05D 2240/127* (2013.01); *F05D 2250/183* (2013.01); *F05D 2250/75* (2013.01); *F05D 2260/2212* (2013.01)

(58) Field of Classification Search
CPC . F01D 5/141; F01D 5/18; F01D 5/187; F01D 5/188; F01D 25/12; F05D 2240/127; F05D 2260/221; F05D 2260/2212; F05D 2260/2214; F05D 2260/22141; F05D 2250/183; F05D 2250/75
See application file for complete search history.

(56) References Cited

U.S. PATENT DOCUMENTS

| 4,627,480 | A  | * | 12/1986 | Lee ........................ B22C 9/04 164/122.1 |
| 5,052,889 | A  | * | 10/1991 | Abdel-Messeh ........ F01D 5/187 165/170 |
| 6,666,262 | B1 | * | 12/2003 | Parneix ..................... F28F 1/40 165/109.1 |
| 7,866,947 | B2 |   | 1/2011  | Pietraszkiewicz et al. |
| 8,317,474 | B1 |   | 11/2012 | Liang |
| 2008/0159874 | A1 | * | 7/2008 | Pietraszkiewicz ...... F01D 5/186 416/96 R |

(Continued)

FOREIGN PATENT DOCUMENTS

| DE | 19526917 A1    | 1/1997  |
| WO | 2004035992 A1  | 4/2004  |
| WO | 2014175937 A2  | 10/2014 |

OTHER PUBLICATIONS

EP search report for EP19179785.1 dated Oct. 22, 2019.

*Primary Examiner* — Courtney D Heinle
*Assistant Examiner* — Elton K Wong
(74) *Attorney, Agent, or Firm* — Getz Balich LLC (57) ABSTRACT

An airfoil includes a first wall and a second wall that at least partially define a channel, and a trip strip coupled to the first wall, where at least a part of the trip strip forms a corrugated pattern. A gas turbine engine includes a compressor section, a combustor section, and a turbine section, where the turbine section includes an airfoil, where the airfoil includes a first wall and a second wall that at least partially define a channel, and a trip strip coupled to the first wall, where at least a part of the trip strip forms a corrugated pattern.

14 Claims, 12 Drawing Sheets

(56) References Cited

U.S. PATENT DOCUMENTS

| | | | |
|---|---|---|---|
| 2014/0219813 A1* | 8/2014 | Perez | F01D 5/188 |
| | | | 416/96 R |
| 2015/0377029 A1* | 12/2015 | Blake | F01D 5/187 |
| | | | 416/232 |
| 2016/0032730 A1* | 2/2016 | Thomen | F01D 5/187 |
| | | | 415/115 |
| 2016/0237849 A1* | 8/2016 | King | F01D 5/187 |
| 2017/0030210 A1* | 2/2017 | Oyarbide | F01D 9/065 |
| 2018/0156041 A1* | 6/2018 | Clark | F01D 5/187 |
| 2019/0093487 A1* | 3/2019 | Marsh | F01D 5/186 |

* cited by examiner

TRIP STRIPS FOR AUGMENTED BOUNDARY LAYER MIXING

BACKGROUND

Gas turbine engines, such as those which power aircraft and industrial equipment, may employ a compressor to compress air that is drawn into the engine and a turbine to capture energy associated with a combustion of a fuel-air mixture. Turbine airfoils are subjected to elevated temperatures as a result of such combustion. In order to ensure that the structural and functional integrity of a turbine airfoil is maintained, most engines incorporate a cooling technique that utilizes a flow of cooling air within cavities/channels of the airfoil. The cooling air absorbs heat from the walls of the airfoil, thereby reducing the operating temperature of the airfoil walls. The cooling air represents a resource of the engine and its use impacts the performance/efficiency of the engine. Accordingly, the cooling air must be used effectively in order to promote engine efficiency.

Figure 3A:
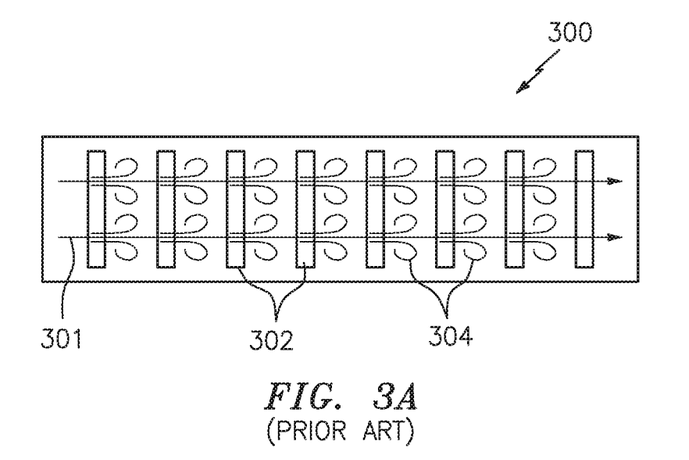
FIGS. 3A-3B illustrate a cooling channel in accordance with the prior art.
Figure 3B:
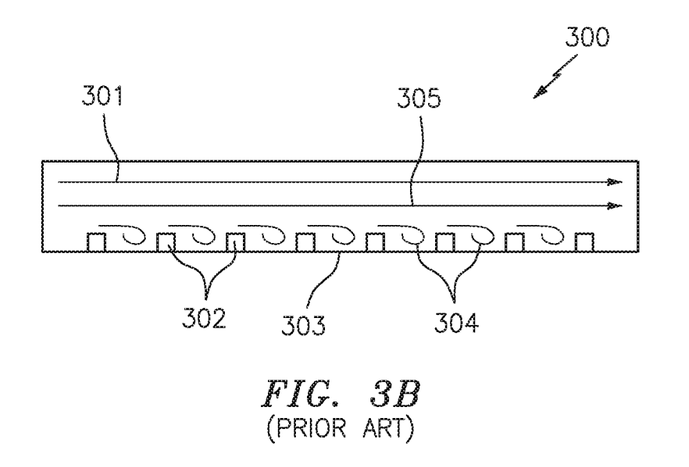

A technique for increasing the effectiveness of the cooling air (e.g., a technique to increase an amount of cooling or reduction in temperature obtained relative to the amount or volume of cooling air that is used [referred to as a heat transfer coefficient]) is to incorporate trip strips in the channels. For example, FIGS. 3A-3B illustrate a (n arrangement of a) channel 300. In particular, in FIGS. 3A-3B cooling air 301 flows through the channel 300 in, e.g., a left-to-right fashion. Trip strips 302 (which are located on a wall 303 of the channel 300) trip/impede the flow of the cooling air 301 through the channel 300 and increase the turbulence of the cooling air in the channel 300, thereby generating separated regions of flow 304 behind the trip strips 302. The tripped/separated flows 304 have a lower velocity from a bulk flow 305 (where the bulk flow 305 corresponds to the portion of the cooling air 301 that bypasses/is not impeded by the trip strips 302), tend to swirl and mix, and thus increase an exchange of heat between the channel walls (e.g., the wall 303) and the cooling air 301.

While the use of trip strips is generally effective in terms of reducing the temperature of a channel wall, further enhancements are necessary to increase the effectiveness of the cooling air (e.g., to increase the heat transfer coefficient).

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to an airfoil comprising: a first wall and a second wall that at least partially define a channel, and a trip strip coupled to the first wall, where at least a part of the trip strip forms a corrugated pattern. In some embodiments, the airfoil comprises a plurality of trip strips coupled to the first wall, where the plurality of trip strips include the trip strip. In some embodiments, at least part of each of the plurality of trips strips forms a corrugated pattern. In some embodiments, an entirety of the trip strip forms a corrugated pattern. In some embodiments, the trip strip includes a member, and where the member includes a first leg and a second leg. In some embodiments, the member is substantially shaped as a 'V' of the English alphabet. In some embodiments, the first leg and the second leg define an angle between them, and the angle is less than ninety degrees and greater than zero degrees. In some embodiments, the first leg and the second leg are joined at a vertex, and the first leg and the second leg are curved legs. In some embodiments, the airfoil comprises a second trip strip coupled to the second wall, where the first wall and the second wall are opposed to one another. In some embodiments, the airfoil comprises a third wall and a fourth wall that at least partially define the channel, a third trip strip coupled to the third wall, and a fourth trip strip coupled to the fourth wall. In some embodiments, the trip strip includes a member that is of a straight profile. In some embodiments, the trip strip includes a first member that forms a part of the corrugated pattern and a second member that forms a part of the corrugated pattern, and where the first member includes a first leg that has a first length and the second member includes a second leg that has a second length, and where the first length is different from the second length. In some embodiments, the corrugated pattern is defined by a plurality of members that each include a vertex, and each of the vertices of the corrugated pattern is skewed relative to a flow direction of a fluid in the channel. In some embodiments, the vertices are skewed by an angle within a range of thirty degrees and sixty degrees relative to the flow direction.

Aspects of the disclosure are directed to a gas turbine engine comprising: a compressor section, a combustor section, and a turbine section, where the turbine section includes an airfoil, where the airfoil includes a first wall and a second wall that at least partially define a channel, and a trip strip coupled to the first wall, where at least a part of the trip strip forms a corrugated pattern. In some embodiments, the airfoil is part of a non-rotatable vane. In some embodiments, the airfoil is part of a rotatable blade. In some embodiments, the channel conveys a fluid to cool the first wall and the second wall. In some embodiments, the gas turbine engine comprises a pipe coupled to the compressor section and the turbine section that conveys the fluid from the compressor section to the turbine section. In some embodiments, the airfoil includes a second trip strip coupled to the first wall, and the fluid converges and diverges in traversing the channel between the first trip strip and the second trip strip.

BRIEF DESCRIPTION OF THE DRAWINGS

The present disclosure is illustrated by way of example and not limited in the accompanying figures in which like reference numerals indicate similar elements. The figures are not necessarily drawn to scale unless explicitly indicated otherwise.

DETAILED DESCRIPTION

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities and/or a gap/space between entities.

Figure 1:
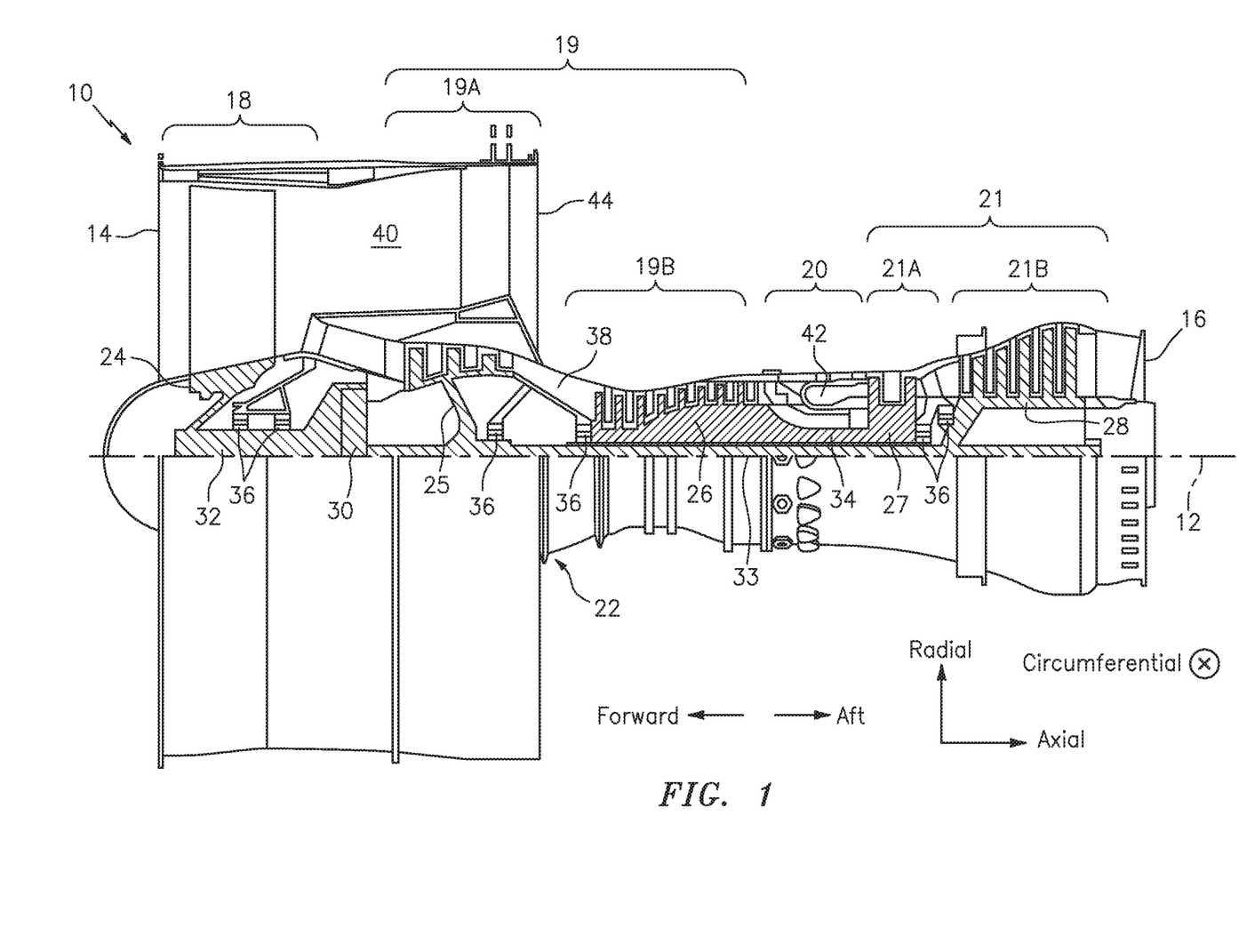
FIG. 1 is a side cutaway illustration of a gas turbine engine.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36 (e.g., rolling element and/or thrust bearings). Each of these bearings 36 is connected to the engine housing 22 by at least one stationary structure such as, for example, an annular support strut.

As one skilled in the art would appreciate, in some embodiments a fan drive gear system (FDGS), which may be incorporated as part of the gear train 30, may be used to separate the rotation of the fan rotor 24 from the rotation of the rotor 25 of the low pressure compressor section 19A and the rotor 28 of the low pressure turbine section 21B. For example, such an FDGS may allow the fan rotor 24 to rotate at a different (e.g., slower) speed relative to the rotors 25 and 28.

During operation, air enters the turbine engine 10 through the airflow inlet 14, and is directed through the fan section 18 and into a core gas path/duct 38 and a bypass gas path/duct 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 2:
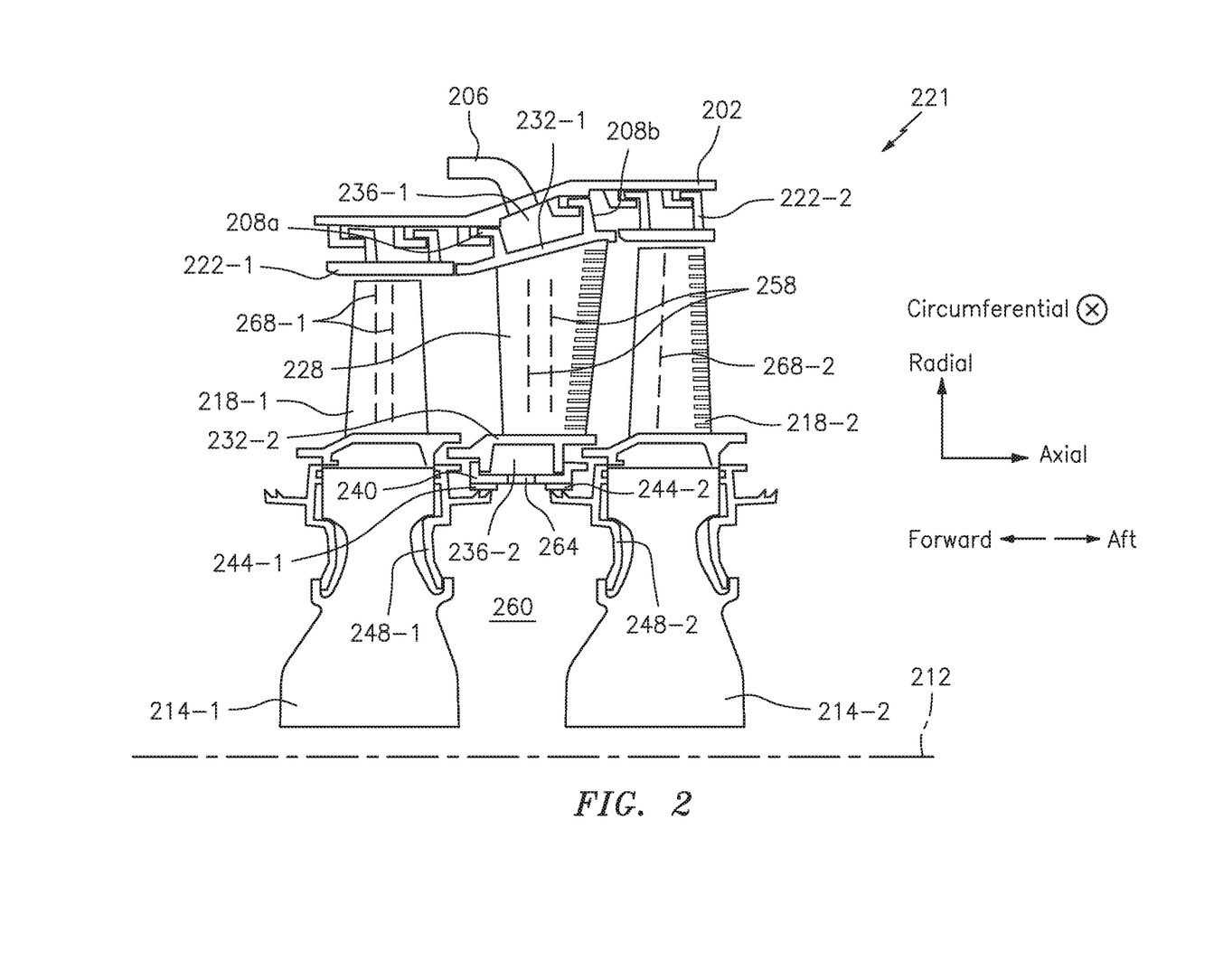
FIG. 2 illustrates a portion of a turbine section of an engine.

Referring to FIG. 2, a portion of a turbine section 221 of an engine is shown. The portion of the turbine section 221 may correspond to a portion of the turbine section 21 of FIG. 1. Also shown in FIG. 2 is an engine longitudinal centerline 212 (which may correspond to the centerline 12 of FIG. 1).

The turbine section 221 may include a case 202 and a conduit/pipe 206. The case 202 may be arranged as a full-hoop structure. The pipe 206 may supply a cooling fluid (e.g., cooling air) to a vane cavity as is described further below. The cooling fluid may be obtained from one or more sources; for example, the cooling fluid may be obtained from a compressor section of an engine (see, e.g., compressor section 19 of FIG. 1), from an output of a heat exchanger, etc.

While a single pipe 206 is shown, in some embodiments more than one pipe 206 may be included. For example, in some embodiments between two and four pipes 206 may be located around the circumference of the turbine section 221.

The turbine section 221 may include alternating stages of rotational structure and static structure. For example, the turbine section 221 may include a first rotor disk 214-1 and a second rotor disk 214-2, where the second rotor disk 214-2 is disposed axially aft of the first rotor disk 214-1. The rotor disks 214-1 and 214-2 may be coupled to respective airfoils/blades 218-1 and 218-2. The airfoils 218-1 and 218-2 may interface to respective seals 222-1 and 222-2. As shown in FIG. 2, the seals 222-1 and 222-2 may be coupled to the case 202. Each of the seals 222-1 and 222-2 is frequently referred to as a blade outer air seal (BOAS).

Axially disposed between, e.g., the first rotor disk 214-1 and the second rotor disk 214-2 may be a stage of static (e.g., non-rotating) structure, frequently referred to as a vane. The vane may include an airfoil 228 that is bounded by a (radially outer) platform 232-1 and a (radially inner) platform 232-2. A forward platform rail 208a and an aft platform rail 208b may couple the outer platform 232-1 to the case 202.

The case 202 and the outer platform 232-1 may at least partially define an outer vane cavity 236-1. The inner platform 232-2 and a seal 240 may at least partially define an inner vane cavity 236-2. The seal 240 may be arranged as a full-hoop structure.

The seal 240 may include, or be coupled to, one or more seal lands. For example, FIG. 2 illustrates a first seal land 244-1 and a second seal land 244-2. The seal lands 244-1 and 244-2 may interface to respective cover plates 248-1 and 248-2. The cover plates 248-1 and 248-2 may be coupled to the first rotor disk 214-1 and the second rotor disk 214-2, respectively. The cover plates 248-1 and 248-2 may be arranged as full-hoop structures.

When the engine is operated, cooling fluid supplied via the pipe 206 may enter the outer vane cavity 236-1. From the outer vane cavity 236-1, the cooling fluid may enter the airfoil 228 (via, e.g., one or more holes/apertures formed in the platform 232-1) and flow in, e.g., a radially inward/inboard direction via one or more cooling channels 258. At least a portion of the cooling fluid may be admitted from the cooling channel(s) 258 into the inner vane cavity 236-2 (via, e.g., one or more holes/apertures formed in the platform 232-2). From the inner vane cavity 236-2, the cooling fluid may be provided to a rotor cavity 260 via an orifice 264 defined by the seal 240. The rotor cavity 260 may be at least partially defined/bounded by the disks 214-1 and 214-2, the cover plates 248-1 and 248-2, and the seal 240. A portion of the fluid in the rotor cavity 260 may bypass the interfaces between the cover plates 248-1 and 248-2 and their respective seal lands 244-1 and 244-2 and may cool, e.g., the airfoils 218-1 and 218-2.

While the pipe 206 is shown as being fluidly coupled to the outer vane cavity 236-1, in some embodiments the pipe 206 may be coupled to the inner vane cavity 236-2. Stated differently, the cooling fluid may initially be supplied to the inner vane cavity 236-2 to cool, e.g., the inner platform 232-2; from the inner vane cavity 236-2, at least a portion of the cooling fluid may traverse the airfoil 228 via the cooling channels 258 and flow to, e.g., the outer vane cavity 236-1.

The cooling channels 258 may be used to cool or reduce a temperature of the airfoil 228. Cooling channel(s) 268-1 and 268-2 may be included in the airfoils 218-1 and 218-2, respectively, to cool or reduce a temperature of the airfoils 218-1 and 218-2. Cooling fluid may be routed through the cooling channel(s) 268-1 and 268-2 in a manner similar to that described above in relation to the cooling channels 258. More generally, a component may be manufactured/fabricated to include cooling channels to facilitate a reduction in a temperature of that component.

Various exemplary embodiments of cooling channels are described below. The cooling channels described below may be implemented in conjunction with one or more of the cooling channels described above (e.g., the cooling channels 258/268-1/268-2).

Figure 4A:
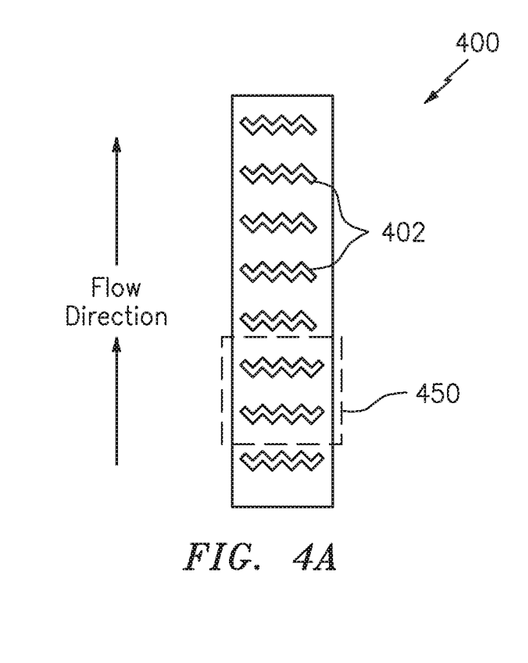
FIGS. 4A-4B illustrate a cooling channel that incorporates a corrugated pattern trip strip on a wall of the cooling channel.
Figure 4B:
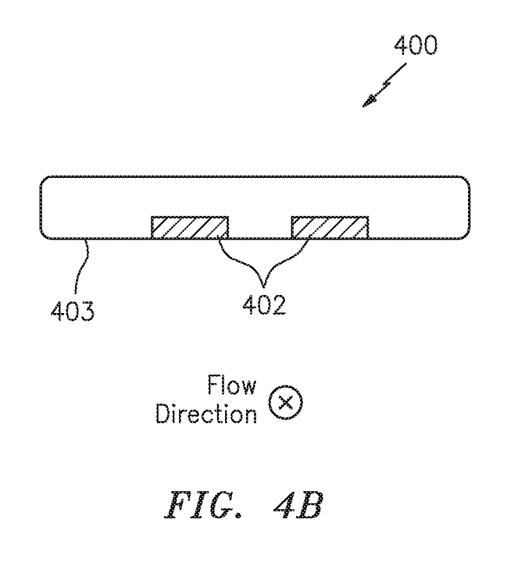

Referring to FIGS. 4A-4B, an example of a cooling channel 400 is shown. Also superimposed in FIGS. 4A-4B is a flow direction, which corresponds to the direction that cooling fluid flows in the channel 400.

The cooling channel 400 includes trip strips 402 that may be disposed/located on a wall 403 of the cooling channel 400. Whereas each of the trip strips 302 are shown as being substantially straight members in FIG. 3A, each of the trip strips 402 of FIG. 4A may form a corrugated pattern. For example, the corrugated pattern may include/be composed of a number of members, where each member may substantially correspond to the shape of the letter 'V' (or, analogously, at least a portion of the shape of one or more of the letters 'E', 'M' or 'W') of the English alphabet as shown in FIG. 4A.

Figure 4C:
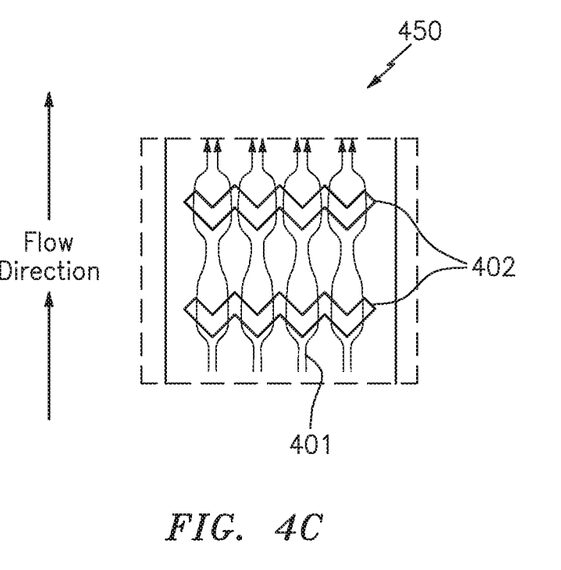
FIG. 4C illustrates a converging/diverging flow pattern that may be obtained based on the corrugated pattern trip strips of FIGS. 4A-4B.

A closer view of the trip strips 402 bounded by the box 450 in FIG. 4A is shown in FIG. 4C. Also shown in FIG. 4C is a flow of cooling fluid 401. The corrugated pattern of the trip strips 402 may encourage the flow of the cooling fluid 401 over the trip strips 402 to repeatedly converge and diverge as shown in FIG. 4C. When the cooling fluid flows/paths reach a state of increased (e.g., maximum) convergence, that may establish a local region of high pressure that may have a tendency to want to expand (and hence, diverge the flows/paths) to a lower pressure environment.

As a result of such convergence/divergence, lateral mixing (e.g., mixing to the left and right in FIG. 4C) may be obtained in addition to the turbulent flows that result from tripping/impeding the cooling fluid flow (see, e.g., the separated/turbulent flows 304 in FIG. 3B). The lateral mixing may increase the overall mixing that occurs, such that an increase in the heat transfer coefficient may be realized/obtained. In contrast to the cooling air 301 in the cooling channel 300 of FIGS. 3A-3B, the cooling fluid 401 may realize less of a pressure drop in traversing the cooling channel 400 since no portion of the corrugated-patterned trip strips 402 are directly opposed to the flow direction. The corrugated-patterned trip strips 402 tend to redirect the flow, rather than stop/oppose the flow.

Figure 4D:
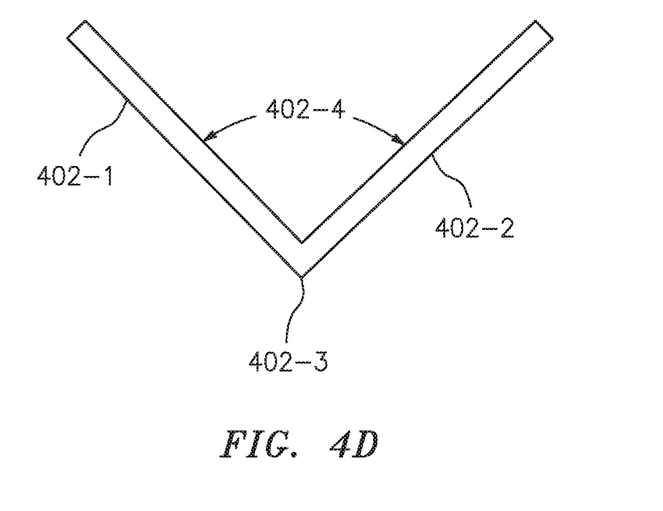
FIG. 4D illustrates a member of a trip strip of FIG. 4A.

Referring to FIG. 4D, a closer view of one of the aforementioned members of a trip strip 402 is shown. In particular, a trip strip 402 member may include a first leg/segment 402-1 and a second leg/segment 402-2 that emanate from a vertex 402-3 that collectively form a substantial 'V'-shape as described above. The first leg 402-1 and the second leg 402-2 may define an angle 402-4 between them.

The angle 402-4 may assume one or more values. For example, in some embodiments the angle 402-4 may be a value that is less than or equal to ninety degrees and greater than zero degrees. Generally speaking, the smaller the value of the angle the smoother/more gradual the (lateral) mixing that is obtained. An angle equal to zero degrees (or approximately zero degrees) may impose challenges in terms of manufacturability/reliability (e.g., elevated stress concentrations may be present at the interface/vertex 402-3 between the legs 402-1 and 402-2 when the angle 402-4 is approximately equal to zero). Accordingly, trade-offs may be made to arrive at a value of the angle 402-4 that is suitable for the particular application at hand. One or more simulations, tests, etc., may be conducted to determine/verify the value of the angle 402-4 to use for the application.

Figure 5:
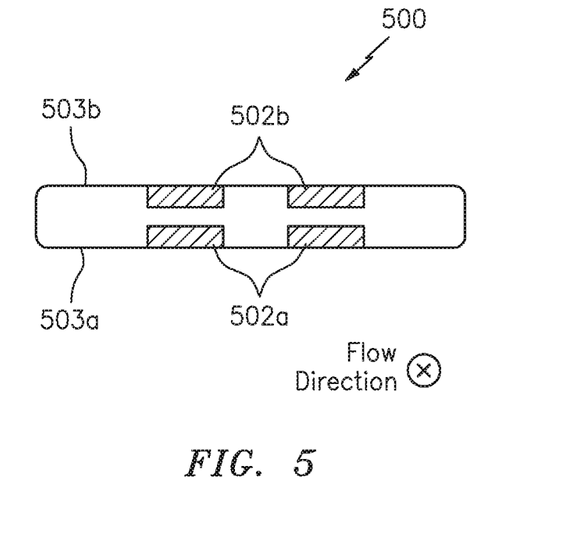
FIG. 5 illustrates a cooling channel that incorporates trip strips on two walls of the cooling channel.

Variations on the corrugated-patterned trip strips 402 of FIGS. 4A-4D may be utilized in some embodiments. For example, whereas in FIG. 4B the trip strips 402 are shown as being disposed on a (single) wall 403, as shown in FIG. 5 a cooling channel 500 may include one or more (corrugated-patterned) trip strips 502a disposed on a first wall 503a and one or more (corrugated-patterned) trip strips 502b disposed on a second wall 503b. The cooling channel 500 may be used to enhance cooling with respect to two cooling channel walls (relative to the cooling channel 400 with a single wall 403 that includes trip strips 402 as shown in FIG. 4B).

Figure 6:
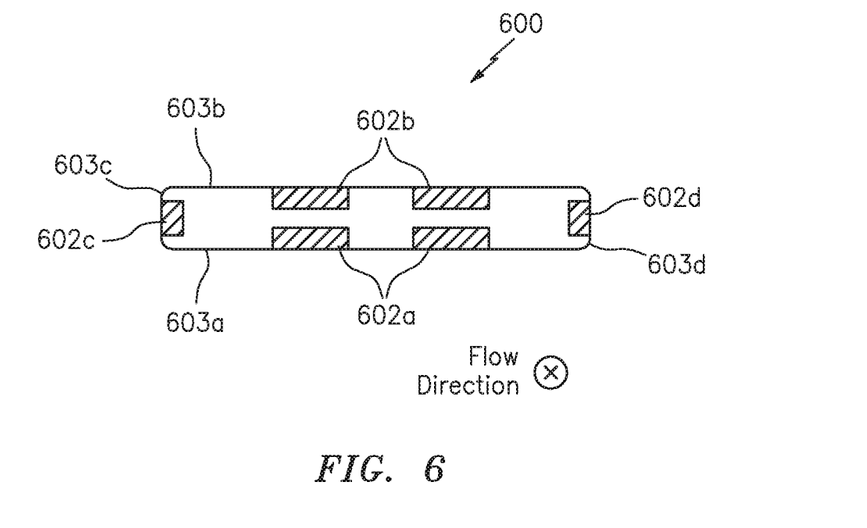
FIG. 6 illustrates a cooling channel that incorporates trip strips on four walls of the cooling channel.

FIG. 6 illustrates a cooling channel 600 that may include one or more (corrugated-patterned) trip strips 602a, 602b, 602c, and 602d disposed on walls 603a, 603b, 603c, and 603d, respectively. Relative to the cooling channels 400 and 500, the cooling channel 600 may be used in applications/environments characterized by elevated/extreme temperatures, where the use of cooling is of paramount importance. Regarding cooling efficiency in terms of an amount of cooling obtained per dimension of trip strip used, the cooling efficiency that is obtained in cooling channels 400 and 500 may be greater than the cooling efficiency that is obtained in the cooling channel 600. For example, the corners of the cooling channel 600 where the walls 603b and 603c meet may not obtain much in the way of benefit as far as the use of, e.g., the trip strip 602c is concerned. Stated differently, at/proximate the corner between the walls 603b and 603c (or the corner between the walls 603a and 603c) the trip strip 602c may incur reduced performance/efficiency in terms of cooling relative to a remainder (e.g., the center) of the trip strip 602c.

Figure 7:
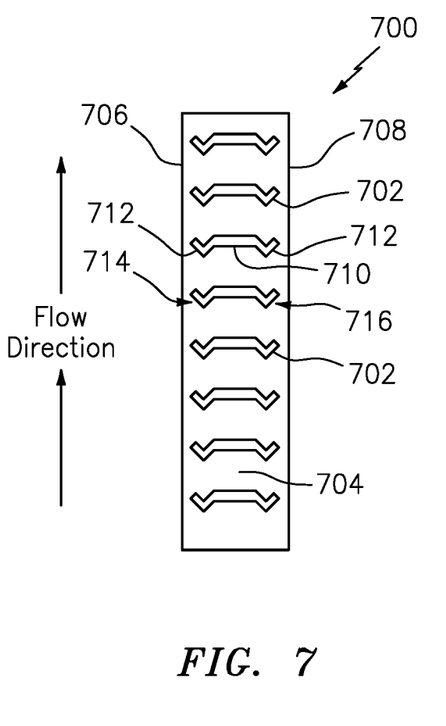
FIG. 7 illustrates a cooling channel that incorporates trip strips that have a corrugated-straight pattern.

Referring to FIG. 7, a cooling channel 700 is shown having a plurality of walls as illustrated, for exmaple, in FIG. 6. The plurality of walls may include a first wall 704, a second wall (not shown) opposite the first wall 704, a third wall 706 extending between the first wall 704 and the second wall, and a fourth wall 708 opposite the third wall 706 and extending between the first wall 704 and the second wall. The cooling channel 700 may include trip strips 702. In comparing FIGS. 3A, 4A, 4D, and 7, the trip strips 702 may incorporate aspects of the trip strips 302 and the trip strips 402. For example, as shown in FIG. 7 each of the trip strips 702 may include a first (e.g., center) member 710 that is of a straight profile/pattern similar to the trip strips 302 of FIG. 3A, and one or more additional (e.g., outer) members 712 coupled to the center member 710 that are of a 'V'-shaped profile similar to the trip strips 402 shown in conjunction with FIGS. 4A and 4D. The center member 710 may have a straight profile extending in a direction between a first lengthwise end 714 and a second lengthwise end 716 of the trip strip 702. The direction of the center member 710 may be perpendicular to the third wall 706 and the fourth wall 708. The trip strips 702 may be referred to as having a corrugated-straight pattern.

The trip strips 702 may be easier to manufacture than, e.g., the trip strips 402 due to the presence of the first/straight member. The trip strips 702 may provide enhanced cooling relative to the trip strips 302 due to the presence of the 'V'-shaped members. The trip strips 702 may not provide as much (lateral) cooling as the trip strips 402 due to the presence of the first/straight member. Thus, the trip strips 702 may find particular utility in conjunction with embodiments that may require an incremental degree of enhanced cooling.

Figure 8:
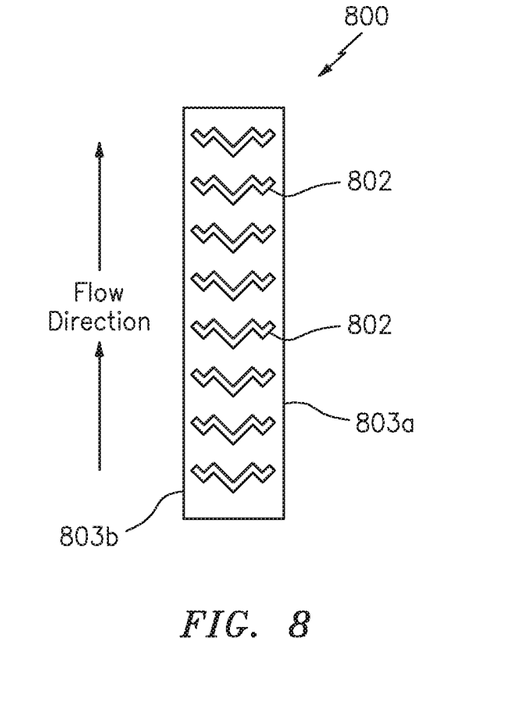
FIG. 8 illustrates a cooling channel that incorporates trip strips that have a variable length corrugated pattern.

Referring to FIG. 8, a cooling channel 800 is shown. The cooling channel 800 may include trip strips 802. The trip strips 802 may be similar to the trip strips 402 shown in conjunction with FIGS. 4A and 4D in the sense that the trip strips 802 may be composed of 'V'-shaped members (e.g., may be entirely composed of 'V'-shaped members in some embodiments). However, the trip strips 802 may differ from the trip strips 402 in that the members of the trip strips 802 may not be uniform with respect to one another. For example, as shown in FIG. 8 each of the trip strips 802 may include a first (e.g., center) member composed of legs that are longer than counterpart legs of the other members. The trip strips 802 may be referred to as having a variable length corrugated pattern.

The trips strips 802 may be easier to manufacture than, e.g., the trip strips 402 due to the presence of the first/longer-legged member. For example, larger shapes/features may be easier to manufacture than smaller shapes/features. Additionally, larger shapes/features tend to have a greater impact on the magnitude of flow alteration that is obtained. Thus, in relation to the converging/diverging cooling fluid flow pattern described above in connection with FIGS. 4A and 4C (where the converging/diverging behavior is substantially symmetrical/uniform across the cooling channel 400 in a direction that is perpendicular to the flow direction), the converging/diverging pattern that is obtained in FIG. 8 may be asymmetrical/non-uniform. For example, the converging/diverging pattern may be more pronounced proximate the first/center member of the trip strips 802 relative to the converging/diverging pattern that is obtained closer to the walls 803a and 803b.

Figure 9:
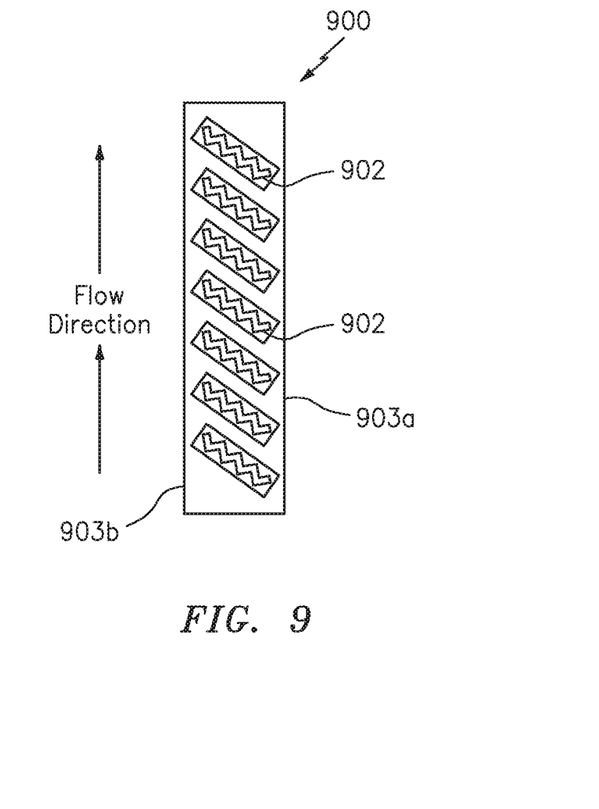
FIG. 9 illustrates a cooling channel that incorporates trip strips that have a skewed-corrugated pattern.

Referring to FIG. 9, a cooling channel 900 is shown. The cooling channel 900 may include trip strips 902. The trip strips 902 may be similar to the trip strips 402 shown in conjunction with FIGS. 4A and 4D in the sense that the trip strips 902 may be composed of 'V'-shaped members (e.g., may be entirely composed of 'V'-shaped members in some embodiments). However, the trip strips 902 may differ from the trip strips 402 in that the trip strips 902 may assume a different orientation/angle relative to, e.g., the flow direction. For example, in comparing FIGS. 4A and 9 the trip strips 902 (or more particularly, vertices of the members of the trip strips 902) are shown as being rotated/skewed clockwise by an angle of approximately forty-five degrees relative to the trip strips 402. In some embodiments, the skew relative to the flow direction may be a value within a range of thirty degrees to sixty degrees. The trip strips 902 may be referred to as having a skewed-corrugated pattern.

The trip strips 902 may cause a cooling flow (that is generally oriented in the direction of the flow direction superimposed in FIG. 9) to be steered towards the wall 903b (and away from the wall 903a). In this respect, the configuration shown in FIG. 9 may find particular applicability in embodiments where cooling the wall 903b is of greater concern relative to the wall 903a.

Figure 10:
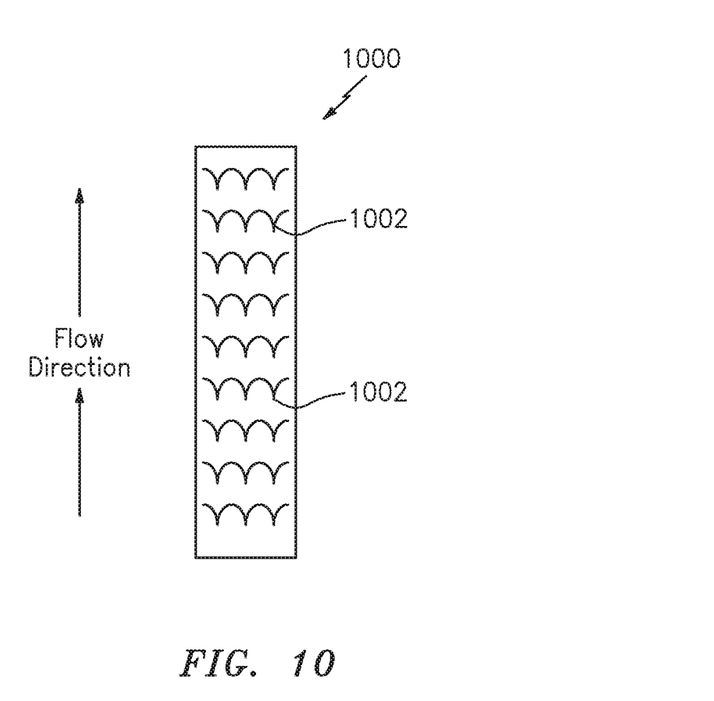
FIG. 10 illustrates a cooling channel that incorporates trip strips that have a pointed leading edge and curved legs emanating from the pointed leading edge.

Referring to FIG. 10, a cooling channel 1000 is shown. The cooling channel 1000 may include trip strips 1002. The trip strips 1002 may be similar to the trip strips 402 shown in conjunction with FIGS. 4A and 4D in the sense that the trip strips 1002 may be composed of members that include a pointed vertex/leading edge (where the leading edge is specified relative to the flow direction). The pointed vertex may help to split the flow, thereby reducing the likelihood of stagnation at the vertex. Whereas the trip strip legs 402-1 and 402-2 are shown as being linear in FIG. 4D, the trip strips 1002 include curved legs in FIG. 10. The use of curved legs in FIG. 10 may gently/smoothly/gradually guide the converging flows together.

In terms of a design of a cooling channel, a particular channel configuration (inclusive of a particular trip strip configuration) that is used may be based on one or more tests, simulations, computational fluid dynamics (CFD) analyses, etc., as would be understood by one of skill in the art based on a review of this disclosure.

Various components of this disclosure may be composed of one or more materials. For example, one or more metals (e.g., nickel, steel, aluminum, titanium, etc.) may be used in a manufacture of an airfoil (inclusive of any walls that form the cooling channels).

One or more techniques may be utilized to manufacture a component of this disclosure. For example, casting, machining, an application of one or more chemicals (e.g., chemical etching), additive manufacturing, etc., may be used.

Some of the examples described herein relate to use of a channel to cool a component via, e.g., a cooling fluid. In some embodiments, a channel may be used to increase a temperature of a component. For example, a channel included in a component may convey a warm fluid (e.g., a fluid at a first temperature that is greater than a second temperature of the component) to de-ice/anti-ice the component.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An airfoil comprising:
a plurality of walls comprising a first wall, a second wall opposite the first wall, a third wall extending between the first wall and the second wall, and a fourth wall opposite the third wall and extending between the first wall and the second wall, the plurality of walls at least partially defining a channel; and
a trip strip coupled to the first wall,
wherein at least a part of the trip strip forms a corrugated pattern,
wherein the trip strip includes a center member, that is of a straight profile extending in a first direction between a first lengthwise end and a second lengthwise end of the trip strip, and at least one outer member shaped as a 'V' of the English alphabet, the at least one outer member including a first leg and a second leg, the first leg and the second leg extending in a second direction and a third direction, respectively, such that each of the second direction and the third direction are transverse with respect to the first direction, and
wherein the first direction is perpendicular to the third wall and the fourth wall.

2. The airfoil of claim 1, further comprising a plurality of trip strips coupled to the first wall, wherein the plurality of trip strips include the trip strip.

3. The airfoil of claim 2, wherein at least part of each of the plurality of trips strips forms a corrugated pattern.

4. The airfoil of claim 1, wherein the first leg and the second leg define an angle between them, and wherein the angle is less than ninety degrees and greater than zero degrees.

5. The airfoil of claim 1, further comprising:
a second trip strip coupled to the second wall.

6. The airfoil of claim 5, further comprising:
a third trip strip coupled to the third wall; and
a fourth trip strip coupled to the fourth wall.

7. The airfoil of claim 1, wherein the at least one outer member includes a first outer member and a second outer member and the center member is disposed between the first outer member and the second outer member.

8. A gas turbine engine comprising:
a compressor section;
a combustor section; and
a turbine section,
wherein the turbine section includes an airfoil,
wherein the airfoil includes a plurality of walls comprising a first wall, a second wall opposite the first wall, a third wall extending between the first wall and the second wall, and a fourth wall opposite the third wall and extending between the first wall and the second wall, the plurality of walls at least partially defining a channel; and
a trip strip coupled to the first wall,
wherein at least a part of the trip strip forms a corrugated pattern,
wherein the trip strip includes a center member, that is of a straight profile extending in a first direction between a first lengthwise end and a second lengthwise end of the trip strip, and at least one outer member shaped as a 'V' of the English alphabet, the at least one outer member including a first leg and a second leg, the first leg and the second leg extending in a second direction and a third direction, respectively, such that each of the second direction and the third direction are transverse with respect to the first direction, and
wherein the first direction is perpendicular to the third wall and the fourth wall.

9. The gas turbine engine of claim 8, wherein the airfoil is part of a non-rotatable vane.

10. The gas turbine engine of claim 8, wherein the airfoil is part of a rotatable blade.

11. The gas turbine engine of claim 8, wherein the channel conveys a fluid to cool the first wall and the second wall.

12. The gas turbine engine of claim 11, further comprising:
a pipe coupled to the compressor section and the turbine section, wherein the pipe conveys the fluid from the compressor section to the turbine section.

13. The gas turbine engine of claim 11, wherein the airfoil includes a second trip strip coupled to the first wall, and wherein the fluid converges and diverges in traversing the channel between the first trip strip and the second trip strip.

14. An airfoil comprising:
a first wall and a second wall that at least partially define a channel; and
a trip strip coupled to the first wall,
wherein at least a part of the trip strip forms a corrugated pattern,
wherein the trip strip includes a center member, that is of a straight profile extending in a first direction between a first lengthwise end and a second lengthwise end of the trip strip, and at least one outer member shaped as a 'V' of the English alphabet, the at least one outer member including a first leg and a second leg, the first leg and the second leg extending in a second direction and a third direction, respectively, such that each of the second direction and the third direction are transverse with respect to the first direction, and
wherein the first direction is perpendicular to a flow direction of a fluid in the channel.

* * * * *